United States Patent [19]

Lenoir

[11] 3,957,860

[45] May 18, 1976

[54] PROCESS FOR THE MANUFACTURE OF NUCLEAR-SULPHONATED COMPOUNDS

[75] Inventor: John Lenoir, Marly, Switzerland

[73] Assignee: Ciba-Geigy AG, Basel, Switzerland

[22] Filed: June 17, 1974

[21] Appl. No.: 480,082

Related U.S. Application Data

[63] Continuation-in-part of Ser. No. 340,641, March 12, 1973, abandoned.

[30] Foreign Application Priority Data

Mar. 16, 1972   Switzerland.......................... 3939/72

[52] U.S. Cl................................. 260/508; 260/470; 260/509; 260/510; 260/501.21

[51] Int. Cl.$^2$............... C07C 143/56; C07C 143/64; C07C 149/40

[58] Field of Search............... 260/509, 510, 501.21, 260/508, 470

[56] References Cited

OTHER PUBLICATIONS

Quilico, Chem. Abstract, 21, 738–739 (1927); 22, 1765, 1965–1966 (1928).

Gilbert, "Sulfonation and Related Reactions," pp. 21–22, 78–80, 353, 354, 362, 379, 413, 414, 417 (1965).

*Primary Examiner*—James O. Thomas, Jr.
*Assistant Examiner*—Nicky Chan
*Attorney, Agent, or Firm*—Joseph G. Kolodny; Edward McC. Roberts; Prabodh I. Almaula

[57] ABSTRACT

This invention relates to a process for the manufacture sulphonated compounds. Aromatically unsaturated amines are reacted with sulphamic acid or its derivatives at temperatures between 20° and 250°C in the presence of an aprotic solvent and a catalyst.

16 Claims, No Drawings

PROCESS FOR THE MANUFACTURE OF NUCLEAR-SULPHONATED COMPOUNDS

This is a continuation-in-part of our copending application Ser. No. 340,641, filed Mar. 12, 1973, now abandoned.

The present invention relates to a process for the manufacture of nuclear-sulphonated aromatically unsaturated homocyclic or heterocyclic compounds.

It is known from literature to employ sulphamic acid as a sulphonating agent for aromatic amines, phenols and aryl ethers (compare, for example, Houben-Weyl 9, page 515 to 516; H. Cerfontain "Mechanistic aspects in aromatic sulfonation and desulfonation" Interscience 1968; A. Quilico, Gazz. 56. 620 to 630 (1926), Gazz 57, 793 (1927), C.A. 21, 738 g, R.A.L. 6, 512 (1927), R.A.L. 7, 141 (1928)); this not only gives low yields of sulphonated product but also results in the formation of isomers and by-products.

According to E. Gilbert "Sulfonation and related reactions", page 20 and thereafter, Interscience (1965), the nuclear sulphonation of aromatic substances by means of sulphamic acid is of no industrial importance, because of the disadvantages mentioned.

German Auslegeschrift No. 1,493,919 has also disclosed the manufacture of hydroquinonesulphonic acids by reaction of hydroquinone with a derivative of sulphamic acid, the reaction being proposed in the presence or absence of a solvent.

It has now been found that sulphamic acid and its derivatives can, under suitable conditions, be used for the manufacture of nuclear-sulphonated aromatically unsaturated compounds, possessing at least one amino group, in high purity and good yield.

The process according to the invention for the manufacture of nuclear-sulphonated, aromatically unsaturated, homocyclic or heterocyclic compounds with at least one amino group which is directly bonded to the aromatically unsaturated ring system and is optionally substituted further is characterised in that a compound of this nature is reacted with a compound of the formula

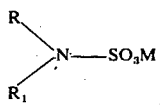  (I)

wherein M denotes a hydrogen atom, the ammonium ion of an unsubstituted or substituted aliphatic, aromatic or heterocyclic amine, the ammonium cation or a metal cation or alkali metal cation or an unsubstituted or substituted phenyl radical, R denotes a hydrogen atom, or an unsubstituted or substituted alkyl, cycloalkyl or aryl radical or a —$SO_3M$ group, wherein M has the abovementioned meaning, and $R_1$ denotes a hydrogen atom, an unsubstituted or substituted alkyl or aryl radical, an unsubstituted or substituted —$NH_2$ group, a —$SO_3M$ or —$(CH_2)_n$—$NHSO_3M$ group, wherein n is a number from 2 to 12 and M has the abovementioned meaning, or a hydroxyl group, a carbamoyl or alkanoyl radical or an unsubstituted or substituted arylcarbonyl or arylsulphonyl radical or R and $R_1$ together with N represent a heterocyclic ring, or mixtures thereof, at temperatures between 20° and 250° C in the presence of an aprotic solvent and in the presence of a catalyst. More particularly the inventive process is carried out with homocyclic aromatic amino compounds with 1 to 3 amino groups directly bonded to the aromatic ring system which are subjected to sulfonation with sulfonating agents of formula (1), wherein M is hydrogen, the ammonium cation or an ammonium ion of the formula $RR_1NH_2$—$^+$, R is hydrogen, alkyl with 1 to 8 carbon atoms or cycloalkyl with 5 or 6 carbon atoms, and $R_1$ is hydrogen, alkyl with 1 to 8 carbon atoms or —$(CH_2)_n$—$NHSO_3M$, with n being an integer of 2 to 12, in the presence of a catalyst which is (a) an alkylsubstituted urea with 1 to 4 alkyl carbon atoms (b) an amide or sulfonamide obtained by reacting aliphatic carboxylic or sulfonic acids with 1 to 8 carbon atoms, benzoic or benzene sulfonic acid with ammonia or alkylamines containing 1 to 4 carbon atoms, (c) a lactam with 4 to 8 ring carbon atoms, (d) a N-heterocyclic mono- or dinuclear compound of the pyridine or pyrazine series, or (e) lower aliphatic tertiary amines, in an aprotic solvent at temperatures between 20° and 250°C.

In a particular embodiment of the process according to the invention, compounds of the formula

  (II)

or mixtures thereof are used, wherein $M_1$ represents a hydrogen atom or the ammonium ion of an unsubstituted or substituted aromatic amine, $R_2$ represents a hydrogen atom or an unsubstituted or substituted alkyl, cycloalkyl or aryl radical, $R_3$ represents a hydrogen atom or an unsubstituted or substituted alkyl radical, the sulphamino group or the —$(CH_2)_2NHSO_3H$ radical or $R_2$ and $R_3$ together with N represent a heterocyclic 5- or 6-membered radical. Preferred are further sulfonating agents of formula (II), wherein $M_1$ is hydrogen, the ammonium cation or an ammonium ion of the formula $R_2R_3NH_2$—$^+$, $R_2$ is hydrogen, alkyl with 1 to 4 carbon atoms or cyclohexyl and $R_3$ is hydrogen or alkyl with 1 to 4 carbon atoms or sulfonating agents of the formula

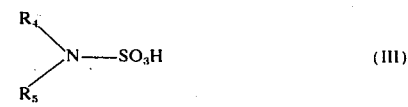  (III)

wherein $R_4$ and $R_5$ denotes hydrogen or ethyl Sulfamic acid and N,N-Diethylamidosulfonic and N-Butylamidosulfonic acid are mostly preferred.

By aprotic solvents there are to be understood solvents which are not capable of transferring protons to the reaction medium. Examples of possible compounds are aliphatic, alicyclic or aromatic hydrocarbons which are unsubstituted or substituted by lower alkyl, nitrile, nitro or halogen, mixtures of such hydrocarbons, aliphatic, cycloaliphatic or aromatic ethers, thioethers, esters, sulphoxides or sulphones, their mixtures, unsubstituted or substituted amides, lactams or N-heterocyclic or aliphatic tertiary amines with the latter themselves acting as catalysts. By substituted or unsubstituted amides there are to be understood compounds such as, for example, acetamide, N,N-dimethylformamide, tetramethylurea and hexamethylphosphoric acid triamide.

Aromatic aliphatic or alcyclic hydrocarbons which are unsubstituted or substituted by lower alkyl, nitrile, nitro or halogen or aliphatic, cycloaliphatic or aromatic esters or sulphones or aliphatic ethers or their mixtures are preferably used as aprotic solvents or diluents. Good results are achieved if chlorobenzene, dichlorobenzenes, trichlorobenzenes, toluene, xylenes, nitrobenzenes, benzonitrile, decalin, tetralin, methylcyclohexane, tetramethylenesulfphone, n-butyronitrile, nitromethane, di-n-butyl ether, n-butyl acetate or dibutyl phthalate are used as aprotic solvents if the reaction is carried out at temperatures between 80° C and 170° C.

Particularly good results are obtained if chlorobenzene, o-dichlorobenzene, nitrobenzene, di-n-butyl ether or n-butyl acetate, especially chlorobenzene or o-dichlorobenzene, are used as aprotic solvents and the reaction is carried out at temperatures between 100° C and 165° C.

Catalysts to be used for the process according to the invention are compounds which contain at least one nitrogen atom as a ring member of a heterocyclic aromatic ring, in an acyl radical directly joined to a —CO— group or —SO$_2$— group, or in a tertiary amine. Accordingly, for example, it is possible to use a catalyst which is a. an alkyl-substituted urea with 1 or 2 alkyl carbon atoms,
b. an amide or sulfonamide obtained by reacting aliphatic carboxylic or sulfonic acids with 1 to 4 carbon atoms, benzoic or benzene sulfonic acid with ammonia or alkylamines containing 1 to 4 carbon atoms
c. a lactam with 4 or 5 ring carbon atoms
d. a nitrogen containing compound of the formula

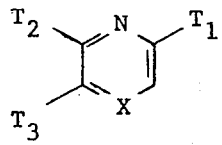

wherein X is —CH= or nitrogen, $T_1$, $T_2$ and $T_3$ each are hydrogen or methyl or $T_2$ and $T_3$ represent the atoms to complete an aromatic ring or (e) tertiary alkylamines with 1 to 4 alkyl carbon atoms per alkyl radical, in an aprotic solvent at temperatures between 20° and 250° C. Examples of theses catalysts are N-methyl-pyrrolid-2-one, ε-caprolactam, N-methyl-piperid-2-one, tetramethylurea, acetamide, N,N-dimethylformamide, N,N,-dimethylacetamide benzamide benzene sulfonic acid amide, quinoline, 2,6-dimethylpyrazine, pyridine, 2-pyridone, 2-picoline, 2,6-lutidine or triethylamine.

However, 2,6-dimethylpyrazine, quinoline, tetramethylurea, N,N-dimethylformamide, N,N-dimethylacetamide or ε-caprolactam, and especially N-methylpyrrolid-2-one are preferred. The catalysts are employed in amounts of 2 to 20 percent by volume, preferably 10 percent by volume.

As a result of the use of the catalysts mentioned it is possible, contrary to earlier teachings, to carry out the reaction with an excess of sulphamic acid or its derivatives (compare Houben-Weyl 9, page 515 to 516). The use of the catalysts furthermore allows the reaction times to be shortened and the reaction temperatures to be lowered, so that compounds nitrated in the nucleus, which are otherwise dangerous to handle, can also be sulphonated.

To carry out the process according to the invention, homocyclic aromatic or heterocyclic compounds which are substituted by halogen atoms or alkyl, halogenoalkyl, alkoxyalkyl, carboxyalkyl, alkoxy, alkoxyalkoxy, amino, acylamino, carboxy, alkoxycarbonyl, carbamoyl, cyano, nitro, alkylsulphonyl, arylsulphonyl, sulpho, sulphamoyl, acyl, alkylmercapto-, arylmercapto or aryloxy radicals are in particular used, the reaction being carried out at temperatures between 70° and 200° C.

In the substituents mentioned, the alkyl radicals possess 1 to 8, preferably 1 to 4, carbon atoms. The compounds may be monocyclic, polycyclic, fused or conjugated. As such, it is possible to use, for example, benzenes, including also diphenyl and stilbene compounds, naphthalenes, phenanthrenes, anthracenes, fluorenes, diphenyls, pyridines, quinolines, quinoxalines, thiophenes, thiazoles, benzofuranes, benzoxazoles, benzimidazoles and indoles.

Preferably, unsubstituted or substituted amines or unsubstituted or substituted heterocyclic compounds possessing at least one amino group bonded to a ring carbon atom are reacted as the aromatically unsaturated, homocyclic or heterocyclic compounds, with aromatic amines of the formulae

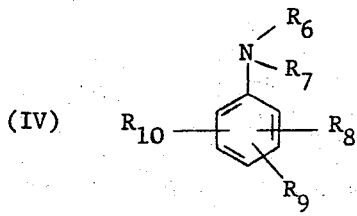

or

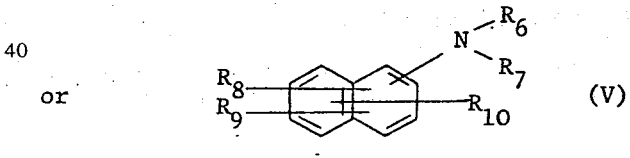

being used, wherein $R_6$ denotes a hydrogen atom or an unsubstituted or substituted alkyl, cycloalkyl, aryl or acyl radical, $R_7$ denotes a hydrogen atom or an unsubstituted or substituted alkyl radical $R_8$, $R_9$ and $R_{10}$ each represent hydrogen or halogen or alkyl, halogenoalkyl, alkoxyalkyl, carboxyalkyl, alkoxy, alkoxyalkoxy, amino, acylamino, carboxy, alkoxycarbonyl, carbamoyl, nitrile, nitro, alkylsulphonyl or arylsulphonyl, sulpho, sulphamoyl, acyl, alkylmercapto, arylmercapto or aryloxy with 1 to 4 carbon atoms in the alkyl radicals.

In a preferred embodiment of the process according to the invention, anilines are reacted which correspond to the formulae (VI)

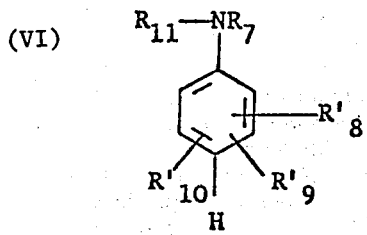

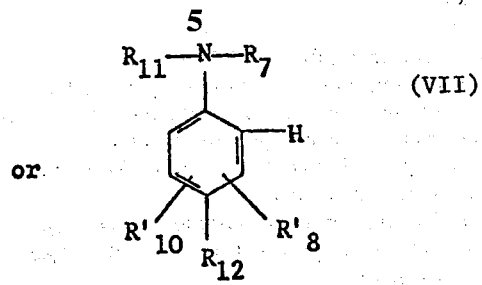

(VII)

wherein $R_7$ has the abovementioned meaning, $R'_8$, $R'_9$, $R'_{10}$ and $R_{12}$ each denote a lower alkyl, halogenoalkyl, alkoxyalkyl, alkoxy, alkoxyalkoxy, amino, acylamino, carboxy, alkoxycarbonyl, carbamoyl, nitrile, nitro, alkylsulphonyl or arylsulphonyl, alkylmercapto or arylmercapto group or a halogen atom, $R'_8$, $R'_9$ and $R'_{10}$ furthermore also each denote a hydrogen atom and $R_{11}$ denotes a hydrogen atom or a lower alkyl or acyl group with 1 to 4 carbon atom in the alkyl radicals and with at most two of the radicals $R'_8$, $R'_9$, $R'_{10}$ and $R_{12}$ being electron attracting groups having a —M effect, and preferably correspond to the formulae

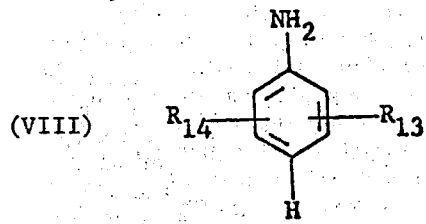

(VIII)

wherein $R_{13}$ and $R_{14}$ each denote a halogen atom or a nitro, nitrile, lower alkylsulphonyl, alkoxycarbonyl, lower alkyl, lower halogenoalkyl, lower alkoxy, acylamino or alkylmercapto group and $R_{14}$ furthermore also denotes a hydrogen atom, with at most one of the radicals $R_{13}$ and $R_{14}$ being an electronattracting group having a —M effect.

Possible electron-attracting groups having a —M effect are, for example, nitro, nitrile, sulphonic acid, and sulphonamide and carboxylic groups.

Particularly good results are obtained if anilines of the formulae

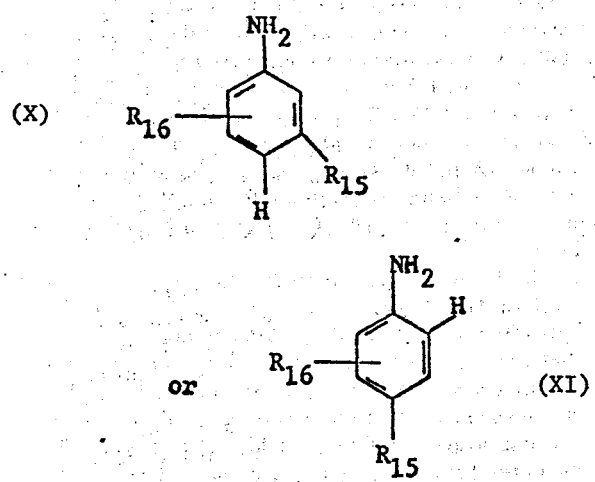

are used, wherein $R_{15}$ denotes chlorine, fluorine, bromine, methyl, trifluoromethyl, methoxy, methylmercapto, acetylamino, benzoylamino or nitro and $R_{16}$ denotes hydrogen, chlorine, fluorine, bromine, methyl, methoxy, acetylamino, benzoylamino or nitro.

High purity and very good yields are obtained if an aniline of the formula

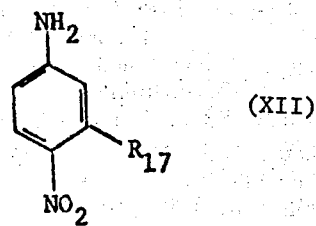

(XII)

wherein $R_{17}$ denotes hydrogen, fluorine, chlorine, trifluoromethyl, methoxy, methylmercapto, methyl or benzoylamino, or 3-nitro-4-methoxyaniline, is reacted with sulphamic acid in accordance with the invention.

Examples of possible unsubstituted or substituted, aromatically unsaturated, homocyclic or heterocyclic compounds with at least one amino group which is bonded to the aromatically unsaturated ring system and is optionally substituted further are the following: 2-, 3- or 4-amino-pyridine, 5-amino-6-methoxy-quinoline,

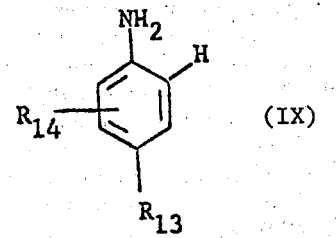

(IX)

6-amino-quinoxaline, 6-amino-2,3-dimethylquinoxaline, 6-amino-2,3-diphenyl-quinoxaline, 2- or 3-aminothiophene, 2-amino-thiazole, 5-amino-2-methyl-benzimidazole, 2,5-diamino-benzthiazole, 5-amino-benzofurane, 2-amino-biphenyl, benzidine, 3,3'-dichlorobenzidine, 3,3'-dimethyl-benzidine, 1- or 2-aminonaphthalene, 1-aminoanthraquinone, 5-amino-1-naphthol-3-sulphonic acid, 1-naphthylamine-7-sulphonc acid, 1-amino-4-phenylmercapto-benzene, 4,4'-diamino-diphenyl ether, (4,4'-diamino)-1,2-diphenylethane, 4,4'-diamino-diphenylmethane, aniline, N-methylaniline, N,N-dimethylaniline, N-phenylpyrrolidine, diphenylamine, 4-amino-diphenylamine, 1-amino-2-, 3- or 4-chlorobenzene, 1-amino-2-, 3- or 4-bromobenzene, 1-amino-2-, 3- or 4-fluorobenzene, 1-amino-2-, 3- or 4-toluene, 1-amino- 2-, 3- or 4-anisole, 2- or 3-methoxy-acetanilide, 2-, 3- or 4-aminobenzoic acid, N-methylanthranilic acid, 4-aminobenzenesulphonic acid, 4-amino-acetanilide, 4-amino-benzaniline, 1-amino-4[p-toluenesulphonylamino-]benzene, 3-trifluoromethylaniline, 4-amino-benzonitrile, 4-amino-benzoic acid ethyl ester, 4-amino-benzoic acid n-butyl ester, 2- or 4-amino-benzophenone, 1-amino-2- or 4-ethylmercaptobenzene, 1-amino-4-[2'-hydroxy-ethylmercapto-]benzene, 1-amino-4-[2'-methoxy-ethylmercapto-]benzene, 1-amino-4-[2'-carboxy-ethylmercapto-]benzene, 4,4'-diamino-diphenylsulphone, 4,4'-diamino-diphenylsulphide, 1,3- 1,2- or 1,4-diaminobenzene, 1-amino-3-propionylaminobenzene, 1-amino-3-(2'-carboxythenoylamino-)benzene, 1-dimethylamino-3-methyl-benzene, 1-octylamino-4-methoxy-benzene, 1-amino-2-(2'-methoxyethoxy-)5-methyl-benzene, 1-amino-2-methyl-5-methoxybenzene, 1-amino-2-ethoxy-5-methoxybenzene, 1-amino-2-methyl-3-chloro-benzene, 1-amino-2,3-, 2,6- or 2,5-dimethyl-benzene, 1-amino-4-acetyl-aminobenzene- 2-sulphonic acid, 1-amino-5-acetylaminobenzene-2-sulphonic acid, 1-amino-2,3-, 2,5- or 2,6-dimethoxybenzene, 2-, 3- or 4-nitroaniline, 1-amino-2-methyl-4-nitrobenzene, 1-amino-2-trifluoromethyl-4-nitrobenzene, 1-amino-2-methoxy-4-nitrobenzene, 1-amino-2-chloro-4-nitrobenzene, 1-amino-2-acetylamino-4-nitrobenzene, 1-amino-2-cyano-4-nitrobenzene, 1-amino-2-carboxy-4-nitrobenzene, 1-amino-2-carboxymethyl-4-nitrobenzene, 1-amino-2-(dimethylcarbonamido)-4-nitrobenzene, 1-amino-2sulphonamido 4-nitrobenzene, 1-amino-2methyl-sulphonyl-4-nitrobenzene, 1-amino-2(4'-methyl-2'-sulphophenyl-sulphonyl)-4-nitrobenzene, 1-amino-2(4'-chloro-2'-carboxyphenyl-sulphonyl)4-nitrobenzene, 1-amino-2-phenoxy-4-nitrobenzene, 2'-amino-5'-nitrobenzenesulphonyl-morpholide, 2-amino-5-nitrobenzanilide, 1-amino-4-bromo-3-nitrobenzene, 1-amino-4-chloro-3nitrobenzene, 1-amino-4fluoro-3nitrobenzene, 1amino-4-methoxy 3-nitrobenzene, 1-amino-4-acetylamino-3-nitrobenzene, 1-amino-4-methylmercapto-3-nitrobenzene, 1-amino-4(2'-methoxyethoxy)3-nitrobenzene, 1-amino-4(-2'-hydroxyethylmercapto)-3-nitrobenzene, 1-amino-4-benzoylamino-3-nitrobenzene, 1-amino-4-methanesulphonylamino-3-nitrobenzene, 1-amino-4-methyl-3-nitrobenzene, 1-amino-3-methyl-6-nitrobenzene, 1-amino-3-chloro-6-nitrobenzene, 1-amino-3-fluoro-6-nitrobenzene, 1-amino-3-acetylamino-6-nitrobenzene, 1-amino-3-trifluoromethyl-6-nitrobenzene, 1-amino-3-benzoylamino-4-nitrobenzene, 1-amino-3-chloro-4-nitrobenzene, 1-amino-3-methoxy-4-nitrobenzene, 1-amino-3-trifluoromethyl-4-nitrobenzene, 1-amino-3-methyl-mercapto-4-nitrobenzene, 1-amino-3-methylsulphonyl-4-nitrobenzene, 1-amino-3-fluoro-4-nitrobenzene, 1-amino-3-(2'-methoxyethoxy)-4-nitrobenzene, 1-amino-3-acetylamino-4-nitrobenzene, 1-amino-3-(4'-methyl-benzenesulphonylamino)-4-nitrobenzene, 1-amino-3-methyl-4-nitrobenzene, 1-amino-2,3-dimethyl-4-nitrobenzene, 1-amino-2,5-dimethyl-4-nitrobenzene, 1-amino-2-methyl-3-chloro-4-nitrobenzene, 1-amino-2,5-dimethoxy-4-nitrobenzene, 1-amino-2-methyl-4-nitro-5-methoxy-benzene, 1-amino-2-methoxy-4-nitro-5-chlorobenzene, 1-amino-2,5-diethoxy-4-nitrobenzene, 1-amino-2,5-di(2'-methoxyethoxy)4-nitrobenzene, 3,6-dimethoxy-o-phenylenediamine, 1-amino-4-bromo-6-nitrobenzene, 1-amino-4-chloro-6-nitrobenzene, 1-amino-4-fluoro-6-nitrobenzene, 1-amino-4-methyl-6-nitrobenzene, 1-amino-4-trifluoromethyl-6-nitrobenzene, 1-amino-4-methoxy-6-nitro-benzene, 1-amino-4-acetylamino-6-nitrobenzene, 1-amino-4-benzoylamino-6-nitrobenzene, 4-methyl-o-phenylenediamine, 4-methoxy-o-phenylenediamine, 4-ethoxy-o-phenylenediamine, 4-cyano-o-phenylenediamine, 3-cyano-o-phenylenediamine, 2-methoxy-5-nitro-p-phenylenediamine, 2-methoxy-4-nitro-m-phenylenediamine, 2-methoxy-1,4,5-triamino-benzene, 3-nitro-4-methoxy-N₁-methyl-o-phenylenediamine, 2-nitro-4-methoxy-N₁-methyl-m-phenylenediamine, 4-methoxy-N₁-methyl-1,2,3-triamino-benzene, 2,3-diamino-4-methyl-anisole, 2-amino-3-nitro-4-methoxy-acetanilide, 3-amino-2-nitro-4-methoxy-acetanilide, 2,3-diamino-4-methoxy-acetanilide, 2-methoxy-4-amino-5-nitro-acetanilide, 2-methoxy-4-nitro-5-aminoacetanilide, 2-methoxy-4,5-diamino-acetanilide, 2-methoxy-acetanilide, 3-methoxy-acetanilide and 3-methyl-acetanilide.

The compounds manufactured according to the process of the invention are valuable intermediate products which can be used for the manufacture of dyestuffs, photochemicals, agricultural chemicals, plastics and pharmaceuticals.

The compounds containing primary amino groups are useful as diazo components in the manufacture of azo dyestuffs.

EXAMPLE 1

19.8 g. of 1-amino-3-nitro-4-methoxybenzene are dissolved in 150 ml of o-dichlorobenzene and 15 ml of 1-methyl-pyrrolid-2-one. The mixture is warmed to 160°–165° C internal temperature and 24 g of sulphamic acid are added in portions whilst stirring. After the addition the reaction mixture is stirred for a further 40 minutes at 165°C and is cooled. The product is filtered off and washed with trichloroethylene. The crude product is suspended in 120 ml of water, warmed at 90°C and stirred at this temperature for 30 minutes. The warm suspension is neutralised with a 33% strength ammonia solution, whereupon the sulphonic acid dissolves. The solution is treated with active charcoal and filtered hot, 48 g of pure ammonium sulphate are added to the hot filtrate and the mixture is cooled to 0°C in order to crystallise. The ammonium salt of 1-amino-3-nitro-4-methoxybenzene-6-sulphonic acid is filtered off and dried at 60°C. 26 g (80% of theory) of this ammonium salt are obtained in the form of orange-red crystals which according to chromatography are a single substance. Melting point 246° to 247°C (decomposition).

EXAMPLE 2 a. 18.3 g of 1-amino-3-methyl-4-nitrobenzene, 120 ml of chlorobenzene, 24 g of sulphamic acid and 12 ml of 1-methylpyrrolid-2-one are warmed to 120°C whilst stirring. The reaction mixture is stirred for 8 hours at this temperature. After cooling, the reaction mixture is filtered and the residue is washed with trichloroethylene and recrystallised from 200 ml of water. The crystals which have precipitated are filtered off, suspended in 100 ml of trichloroethylene, stirred for one hour at 75°C, separated from the organic solvent by filtration and dried at 80°C. 25 g (84% of theory) of yellow crystals, which according to thin layer chromatography are a single substance, of 1-amino-3-methyl-4-nitrobenzene-6-sulphonic acid in the form of its ammonium salt [melting point 290° C (decomposition)]are obtained.

b. 15.2. g of 1-amino-3-methyl-4-nitrobenzene, 100 ml of o-dichlorobenzene and 24 g of sulphamic acid are warmed to 150° C and stirred at this temperature for 16 hours. After cooling, the reaction mixture is further processed in accordance with Example 2. 7.7 g (31 % of theory) of the ammonium salt of 1-amino-3-methyl-4-nitrobenzene-6-sulphonic acid [melting point 292° C (decomposition)] are obtained. Example b) shows that without a catalyst only about the third part of the reaction product can be obtained.

EXAMPLE 3

The following aromatic sulphonic acids were manufactured analogously to Examples 1 and 2.

Table I

| No. | Compound | Melting point in °C | Yield in % of theory |
|---|---|---|---|
| 1 | 2-amino-4-trifluoromethyl-5-nitrobenzenesulfonic acid ammonium salt | 307 (decomposition) | 68 |
| 2 | 2-amino-4-fluoro-5-nitrobenzenesulfonic acid ammonium salt | >300 | 50 |
| 3 | 2-amino-3-nitro-5-acetamidobenzenesulfonic acid ammonium salt | >310 | 30 |
| 4 | 2-amino-3-methoxy-5-nitrobenzenesulfonic acid ammonium salt | 249 (decomposition) | 42 |
| 5 | 2-amino-4-nitro-5-methylthiobenzenesulfonic acid ammonium salt | 242 (decomposition) | 33 |
| 6 | 2-amino-3-nitro-6-acetamidobenzenesulfonic acid ammonium salt | 270 (decomposition) | 65 |

Table I-continued

| No. | Compound | Melting point in °C | Yield in % of theory |
|---|---|---|---|
| 7 | 4-amino-3-nitro-6-methylbenzenesulfonic acid (O$_2$N, NH$_2$, CH$_3$, SO$_3$H) | >310 | 39 |
| 8 | 2-amino-5-(ethoxycarbonyl)benzenesulfonic acid ammonium salt (NH$_2$, SO$_3$NH$_4$, COOC$_2$H$_5$) | 232 (decomposition) | 32 |
| 9 | (NH$_2$, SO$_3$NH$_4$, PhOCHN-, NO$_2$) | >300 | 70 |
| 10 | (NH$_2$, SO$_2$CH$_3$, SO$_3$NH$_4$) | 208 (decomposition) | 15 |
| 11 | (NH$_2$, OC$_2$H$_5$, H$_3$C, SO$_3$NH$_4$) | 145 (decomposition) | 17 |
| 12 | (NH$_2$, SO$_3$NH$_4$, CN) | 293 (decomposition) | 37 |

Table I-continued

| No. | Compound | Melting point in °C | Yield in % of theory |
|---|---|---|---|
| 13 | 2-amino-4-methyl-5-nitrobenzenesulfonate diethylammonium salt | 175 (decomposition) | 55 |
| 14 | 2-amino-3,4-dimethyl-5-nitrobenzenesulfonate ammonium salt | 250 (decomposition) | 82 |
| 15 | 2-amino-3-chloro-5-nitrobenzenesulfonate ammonium salt | 305 (decomposition) | 62 |
| 16 | 2-amino-3-(phenylcarbamoyl)-5-nitrobenzenesulfonate ammonium salt | >300 | 45 |
| 17 | 2-amino-3-(morpholinosulfonyl)-5-nitrobenzenesulfonate ammonium salt | 290 (decomposition) | 49 |
| 18 | 2-amino-4-methoxy-5-nitrobenzenesulfonate ammonium salt | >300 | 75 |

Table I-continued

| No. | Compound | Melting point in °C | Yield in % of theory |
|---|---|---|---|
| 19 | 4-N(CH₃)₂-C₆H₄-SO₃NH₄ | 261 (decomposition) | 28 |
| 20 | 2-NHCH₃, 2-COOH, 5-SO₃NH₄ benzene | 252 (decomposition) | 54 |
| 21 | 2-NH₂, 1-SO₃NH₄, 4-Cl, 5-NO₂ benzene | 308 (decomposition) | 84 |
| 22 | 4-NHCOCH₃, 3-OCH₃, 1-SO₃NH₄ benzene | 254 (decomposition) | 69 |
| 23 | 4-NHCOCH₃, 3-OCH₃, 2-CH₃, 1-SO₃NH₄ benzene | >300 | 52 |
| 24 | 4-NHCOCH₃, 3-CH₃, 1-SO₃NH₄ benzene | >250 | 57 |
| 25 | 2-NH₂, 1-SO₃NH₄, 4-SCH₃, 5-NO₂ benzene | 305 (decomposition) | 89 |

Table I-continued
| No. | Compound | Melting point in °C | Yield in % of theory |
|---|---|---|---|
| 26 | 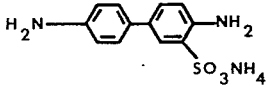 | >300 | 54 |
| 27 | 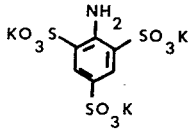 | >300 | 30 |
| 28 | 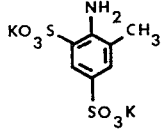 | >300 | 14 |
| 29 | 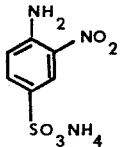 | >300 | 24 |
| 30 | 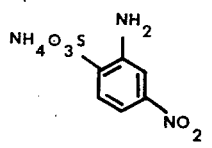 | >300 | 46 |
| 31 | 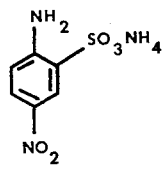 | >300 | 70 |
| 32 | 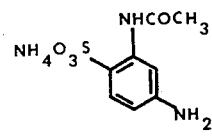 | 290 (decomposition) | 10 |

Table I-continued

| No. | Compound | Melting point in °C | Yield in % of theory |
|-----|----------|---------------------|----------------------|
| 33  | (anthraquinone with NH₂ and SO₃NH₄ substituents) | >300 | 53 |
| 34  | (benzene with NH₂, two SO₃NH₄ groups H₄NO₃S and SO₃NH₄, and NO₂) | >300 | 65 |

Manufacturing Instructions for some starting materials, which are sulfonated according to this invention. Preparation of 3-Benzoylamino-4-nitro-aniline (9) 31 g 1,3-diamino-4-nitrobenzene in 200 ml acetic acid are heated at 95°C. 20 ml acetic anhydride are added dropwise, the resulting raction mixture is refluxed for 1 hour, filtered, cooled and diluted with 700 ml of ice-water. The crystals of 3-amino-4-nitro-acetanilide are filtered and dried; yield 35,4 g; melting point 203°–207°C. 19,6 g crude 3-amino-4-nitro-acetanilide are suspended in 150 ml of pure pyridine and treated by 12,5 ml benzoyl chloride. The mixture is refluxed for 15 minutes, cooled and diluted with ice-water. The crude product thus obtained is suspended in 150 ml ethylcellosolve and 150 ml 3n hydrochloric acid, the reaction mixture is warmed to 80°C and agitated over night at this temperature. After cooling, neutralisation with 2n sodium hydroxide solution and dilution with ice-water, the crude 3-benzoylamino-4 -nitroaniline is filtered, washed with cold water and recrystallised from methylcellosolve. There are obtained 12 g of pure 3-benzoylamino-4-nitroaniline melting point 210°–211°C.

| | | | |
|---|---|---|---|
| Calc.  | C 60.69 | H 4.31 | N 16.34 |
| Found  | C 60.36 | H 4.33 | N 16.42 |

Sulfonation of this product at 110° C according to example 2 gave the sulfonic acid No. 9 of table 1, of formula $C_{13}H_{14}N_4O_6S$.

Calc. C 44.07 H 3.98 S 9.05 N 15.81
Found C 43.91 H 4.01 S 8.95 N 15.80

2-amino-5-nitro-benzanilide (16) was prepared from N-carboxynitro anthranilic anhydride and aniline Meltpoint 202°–205°C (from acetic acid).

| | | | |
|---|---|---|---|
| Calc.  | C 60.70 | H 4.31 | N 16.33 |
| Found  | C 60.87 | H 4.52 | N 16.20 |

Preparation of N-(2'-Amino-5'-nitro-phenylsulfonyl)-morpholine (17): 25,6 g 2-chlor-5-nitro-benzenesulfonyl chloride are added in portions to 19,1 g morpholine in 100 g ice-water, the reaction mixture is reacted for 6 hours at 0° – 5°C. The N(2'-Chlor-5'-nitrophenylsulfonyl)-morpholine is filtered in the cold and washed with water. Yield after crystallisation from methanol: 17,0 g, meltingpoint 138°– 140°C. 40,1 g of the chlorocompound and 4,1 g ammonium chloride in 200 ml ethyleneglycol are warmed to 165°C. Gazeous ammonia is introduced during 5 hours at 165°C. After cooling and dilution with water the crude material is filtered and washed then recrystallised from a methanol: acetone mixture (10:1) Yield: 21 g N-(-2'amino-5'-nitro-benzenesulfonyl)-morpholine, melting point 204°–206°C.

| | | | | |
|---|---|---|---|---|
| Calc.  | C 41.81 | H 4.56 | N 14.63 | S 11.16 |
| Found  | C 41.69 | H 4.42 | N 14.62 | S 11.12 |

EXAMPLE 4

1 mol of 1-amino-3-methyl-4-nitrobenzene, 1,000 ml of one of the solvents indicated below, 198 g of sulphamic acid and the % by volume of catalyst indicated below are reacted analogously to Example 2. The yields of 1-amino-3-methyl-4-nitrobenzene-6-sulphonic acid obtained, and the reaction temperatures are indicated in the table which follows:

TABLE II

| Solvent | % | Catalyst Compound | % Yield* | Reaction temperature in °C |
|---|---|---|---|---|
| Dibutyl ether | 10 | Tetramethylurea | 72 | 110 |
| Toluene | 6 | ε-Caprolactam | 72 | Reflux |
| Diethylene glycol dimethyl ether | 10 | Butyrolactone | 11 | 100 |
| Fluorocyclohexanes (mixture) | 20 | —N-Methyl-pyrrolidone | 62 | 76 |
| Xylene | 10 | —N-Methylformamide | 8 | 120 |
| Nitrobenzene | 10 | —N,N-Dimethylformamide | 68 | 110 |
| Sulpholane | 5 | Acetamide | 56 | 120 |
| Tetralin | 5 | Pyridine | 54 | 130 |
| Benzonitrile | 5 | Quinoline | 58 | 120 |
| Acetic acid n-butyl ester | 10 | N-Methyl-pyrrolidone | 66 | 110 |
| Butyronitrile | 5 | Triethylamine | 53 | 115 |
| Nitromethane | 5 | Benzamide | 65 | 90 |
| Dioxane | 10 | 2,6-Dimethyl-pyrazine | 65 | Reflux |
| Perchloroethylene | 10 | N,N-Dimethylformamide | 51 | 120 |
| Methylcyclohexane | 20 | N-Methylpyrrolidone | 73 | 100 |
| Dibutyl phthalate | 10 | N,N-Dimethylacetamide | 62 | 120 |
| Paraffin oil | 5 | 2-Picoline | 36 | 120 |
| Xylene | 5 | 2,6-Lutidine | 67 | 120 |
| Light benzine | 10 20 | Hexamethylphosphoric acid triamide and N-Methylpyrrolidone | 51 | Reflux |
| Tetrahydrothiophene | 10 | Tetramethylurea | 63 | 110 |
| Diphenylsulphone | 5 | Acetamide | 66 | 110 |
| Trichlorobenzene | 10 | N-Methylpyrrolidone | 70 | 120 |
| Benzophenone | 10 10 | M-Methylpyrrolidone and 2,6-Dimethylpyrazine | 36 | 100 |
| Anisole | 8 | 2-Pyridone | 64 | 100 |
| Dibutyl ether | 5 | Benzenesulphonic acid amide | 72 | 120 |

*Yield of pure o-amino-benzenesulphonic acid, of which the thin layer chromatogram, IR and NMR spectra confirm the structure indicated in Example 2.

EXAMPLE 5

8.4 g of 4-methoxy-5-nitroaniline, 20 g of N,N-diethylamidosulphonic acid and 5 ml of N-methyl-pyrrolidone-2 in 50 ml of o-dichlorobenzene are warmed at 120°C for 6 hours. After cooling, the crude product is filtered off and dissolved in 50 ml of hot water, and 30 % strength sodium hydroxide solution is added until pH 8 is reached. The hot solution is clarified by filtration. After cooling, 6.8 g of 1-amino-3-nitro-4-methoxybenzene-6-sulphonic acid crystallise out in the form of the mixed solium and diethylammonium salt.

EXAMPLE 6

5 ml of diethylamine and 5 g of sulphamic acid in 50 ml of o-dichlorobenzene are warmed for 2 hours at 100°C. 8.4 g of 4-methoxy-5-nitroaniline and 15 g of sulphamic acid are then added to the reaction mixture, and the whole is warmed for 10 hours to 120°C. After cooling, the crude product is filtered off, taken up in water, neutralised with 30 % strength sodium hydroxide solution and dissolved hot. 6.8 g (51 % of theory) of 1-amino-3-nitro-4-methoxybenzene-6-sulphonic acid crystallise out in the form of its diethylammonium salt.

EXAMPLE 7

To 1,5 g n-butylamine in 50 ml of chlorobenzene are added 2 g of sulfamic acid. The reaction mixture is heated and agitated for 2 hours at 100°C. Further 4 g of sulfamic acid, 3,7 g p-dodecylaniline and 5 ml of 2-methyl-pyrrolidone are added to the warm reaction mixture and heating at 100°C continued for 4 hours, after which the starting material is quantitatively converted to a mixture of mono- and disulfonic acids. 2 ml of water were added to the hot reaction mixture, then 6 ml of 50 % aqueous potassium hyydroxide solution; the filtrate was evaporated to dryness and the residue crystallised from 50 ml of methanol. The crystalline product was filtered, washed with ether and dried.

Yield: 1 g of 2-amino-5-dodecyl-benzenesulfonic acid as potassium salt, melting point 225°–227°C

EXAMPLE 8 a. A solution of 11.6 g of 1-amino-3-methyl-4-nitrobenzene-6-sulphonic acid in 100 ml of water is treated with 14 ml of 4N sodium nitrite solution and added over the course of 80 minutes to 100 ml of 2 N hydrochloric acid at 0° to 5°C. The mixture is stirred for a further 30 minutes and the excess nitrite is destroyed with sulphamic acid.

The diazo solution is mixed, at 5° to 8°C and pH 3.5, with a solution of 18 g of 7-(2',6'-dimethylphenylamino)-1-hydroxynaphthalene-3-sulphonic acid and 10 g of crystalline sodium acetate in 200 ml of water and the mixture is stirred for a further 15 hours at 20° to 25°C. After filtration and drying, 21.7 f of the nitroazo dyestuff of the formula shown below are obtained in the form of a dark blue powder.

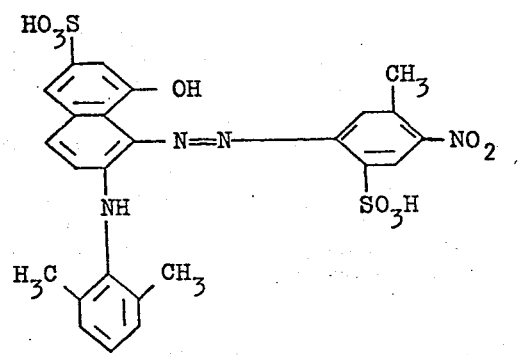

b. A solution of 5.8 g of the compound of the above formula and 20 ml of ferric chloride in 50 ml of water is treated at 40°C with a solution of 3.6 g of sodium sulphide in 8 ml of water and is treated at 40°C with 1 g of sodium sulphide added at intervals of 2 hours until no further nitro compound is detectable in the thin layer chromatogram. The mixture is cooled to 20°C, 25 ml of ethanol are added and the product is precipitated by adding 7 N potassium acetate solution. The yield of aminoazo dyestuff is 4.3 g.

c. 1.1 g of aminoazo dyestuff are dissolved in 30 ml of N-methylpyrrolidone. Terephthaloyl chloride is then added in portions of 10 mg, at 23°C, until the starting product has reacted completely. The mixture is filtered and the dyestuff is precipitated from the filtrate by adding isopropanol and is purified by reprecipitation from water by means of a 1:1 mixture of isopropanol and dioxane. After filtering off and drying 0.5 g of pure diazo dyestuff is obtained in the form of a dark red powder.

I claim:

1. Process for the manufacture of nuclear-sulfonated aromatic compounds which comprises reacting (1) at most tricyclic homocyclic aromatic amino compounds with 1 or 2 amino groups directly bonded to the aromatic ring system and which compounds contain as further substituents halogen, alkyl, halogenoalkyl, alkoxyalkyl, carboxyalkyl, alkoxy, alkoxyalkoxy, carboxyl, alkoxycarbonyl, carbamoyl, nitrile, nitro, alkylsulphonyl, phenylsulphonyl, sulpho, sulphamoyl, alkylmercapto, phenylmercapto or phenoxy where alkyl contains 1 to 8 carbon atoms with (2) a sulfonating agent of the formula

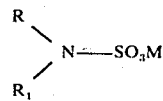

wherein M is hydrogen, the ammonium cation or an ammonium ion of the formula $R R_1 NH_2$—⁺, R is hydrogen, alkyl with 1 to 8 carbon atoms or cycloalkyl with 5 or 6 carbon atoms, and $R_1$ is hydrogen or alkyl with 1 to 8 carbon atoms in the presence of (3) a catalyst which is N-methyl-pyrrolid-2-one, Σ-caprolactam, or N-methyl-piperid-2-one in an aprotic solvent at temperatures between 20° and 250°C.

2. Process according to claim 1, wherein the homocyclic aromatic amino compounds are of the benzene or naphthalene series with 1 or 2 amino groups directly bonded to the aromatic ring system and the sulfonating agent is of the formula

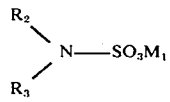

wherein $M_1$ is hydrogen, the ammonium cation or an ammonium ion of the formula $R_2 R_3 NH_2$—⁺, $R_2$ is hydrogen, alkyl with 1 to 4 carbon atoms or cyclohexyl and $R_3$ is hydrogen or alkyl with 1 to 4 carbon atoms.

3. Process according to claim 1, wherein the sulfonating agent corresponds to the formula

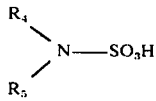

where $R_4$ and $R_5$ denote hydrogen, or ethyl.

4. Process according to claim 2, wherein the homocyclic aromatic amino compound is 3-nitro-4-methoxyaniline the aprotic solvents are chlorobenzene or o-dichlorobenzene and the catalyst in an amount of 10 % by volume is N-methylpyrrolid-2-one and wherein is the reaction is carried out at temperatures between 100° and 165°C.

5. Process according to claim 1, wherein the homocyclic aromatic amino compounds are aromatic amines of the formulae

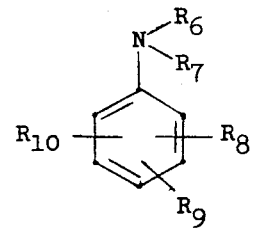

or

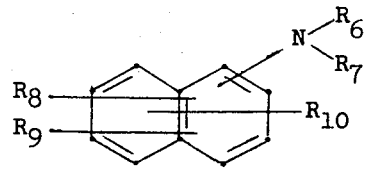

wherein $R_6$ is hydrogen or alkyl, cycloalkyl, or phenyl, $R_7$ is hydrogen or alkyl, where alkyl contains 1 to 8 carbon atoms, $R_8$, $R_9$ and $R_{10}$ each represent hydrogen, halogen, alkyl, halogenoalkyl, alkoxyalkyl, carboxyalkyl, alkoxy, alkoxyalkoxy, carboxyl, alkoxycarbonyl, carbamoyl, nitrile, nitro, alkylsulphonyl, phenylsulphonyl, sulpho, sulphamoyl, alkylmercapto, phenylmercapto or phenoxy, with 1 to 4 carbon atoms in the alkyl radicals.

6. Process according to claim 5, wherein the homocyclic aromatic amino compounds are of the formulae

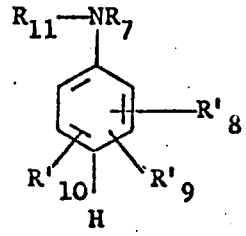

or

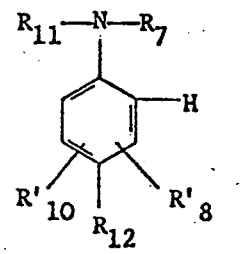

wherein $R_7$ has the meaning indicated in claim 5, $R'_8$, $R'_9$, $R'_{10}$ and $R_{12}$ each denote alkyl, halogenoalkyl, alkoxyalkyl, alkoxy, alkoxyalkoxy, carboxyl, alkoxycarbonyl, carbamoyl, nitrile, nitro, alkylsulphonyl, phenylsulphonyl, alkylmercapto, phenylmercapto or halogen, $R'_8$, $R'_9$ and $R'_{10}$ additionally each also denote hydrogen and $R_{11}$ denotes hydrogen or alkyl with 1 to 4 carbon atoms in the alkyl radicals and with at most two of the radicals $R'_8$, $R'_9$, $R'_{10}$ and $R_{12}$ being electron-attracting groups having a -M effect.

7. Process according to claim 6, wherein the homocyclic aromatic amino compounds are anilines of the formulae

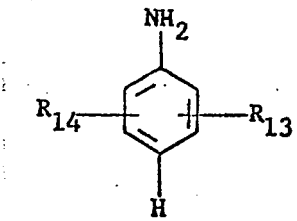 or 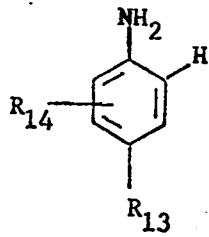

wherein $R_{13}$ and $R_{14}$ each denote halogen, nitro, nitrile, lower alkylsulphonyl, alkoxycarbonyl, lower alkyl, lower halogenoalkyl, lower alkoxy, or alkylmercapto with 1 to 4 carbon atoms in the alkyl or alkoxy radicals and $R_{14}$ also denotes hydrogen, with at most one of the radicals $R_{13}$ and $R_{14}$ being an electron-attracting group having a -M effect.

8. Process according to claim 7, wherein the homocyclic aromatic amino compounds are anilines of the formulae

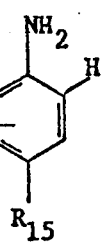

wherein $R_{15}$ denotes chlorine, fluorine, bromine, methyl, trifluoromethyl, methoxy, methylmercapto or nitro and $R_{16}$ denotes hydrogen, chlorine, fluorine, bromine, methyl, methoxy or nitro.

9. Process according to claim 1, wherein sulphamic acid is reacted wtih an aniline of the formula as the homocyclic aromatic amino compound, wherein $R_{17}$ denotes hydrogen, fluorine, chlorine, trifluoromethyl, methyl, methoxy, or methylmercapto.

10. Process according to claim 1, wherein sulphamic acid is reacted with 3-nitro-4-methoxyaniline as the homocyclic aromatic amino compound.

11. Process according to claim 1, wherein the aprotic solvents are aromatic, aliphatic or alicyclic hydrocarbons which are unsubstituted or substituted by lower alkyl, nitrile, nitro or halogen, or their mixtures, aliphatic, cycloaliphatic or aromatic ethers, thioethers, esters or sulphones or their mixtures.

12. Process according to claim 11, wherein the aprotic solvents are aromatic, aliphatic or alicyclic hydrocarbons which are unsubstituted or substituted by lower alkyl, nitrile, nitro or halogen, aliphatic, cycloaliphatic or aromatic esters or sulphones or aliphatic ethers or their mixtures.

13. Process according to claim 12, wherein the aprotic solvents are chlorobenzene, dichlorobenzenes, trichlorobenzenes, toluene, xylenes, nitrobenzene, benzonitrile, decalin, tetralin, methylcyclohexane, sulpholane, n-butyronitrile, nitromethane, di-n-butyl ether, n-butyl acetate or dibutyl phthalate and wherein the reaction is carried out at temperatures between 80°C and 170°C.

14. Process according to claim 13, wherein the aprotic solvents are chlorobenzene, o-dichlorobenzene, nitrobenzene, di-n-butyl ether or n-butyl acetate and wherein the reaction is carried out at temperatures between 100°C and 165°C.

15. Process according to claim 1, wherein the amounts of the catalysts are 2 to 20% by volume, calculated on the volume of the aprotic solvent.

16. A process according to claim 9, in which 1-amino-3-methyl-4-nitrobenzene is sulfonated with sulfamic acid and wherein the catalyst is 1-methylpyrrolid-2-one.

* * * * *